Patented May 25, 1937

2,081,272

UNITED STATES PATENT OFFICE 2,081,272

CATALYST AND PROCESS OF MAKING SAME

Harold B. Foster, Williamsville, N. Y., assignor to National Aniline & Chemical Company, New York, N. Y., a corporation of New York No Drawing. Application January 6, 1933, Serial No. 650,592

18 Claims. (Cl. 23—234)

This invention relates to the catalytic oxidation of chemical compounds in the vapor phase, and more particularly to contact masses employed as catalysts in such reactions and to processes of preparing such contact masses. It relates specifically to improvements in vanadium oxide catalysts and in intermediate products for preparing such catalysts, and to methods of preparing the same.

The catalytic oxidation of chemical compounds by a process in which a gaseous reaction mixture of the chemical compound and an oxidizing gas is passed in contact with a contact mass is well known, and many metallic oxides are known to be useful as catalysts in such processes. Chief among these are the catalysts containing oxides of vanadium either alone or in combination with other oxides or compounds. Since the extent of the catalytic reaction which takes place is a function of the catalytic surface contacted by the gaseous reaction mixture, it is desirable that the vanadium oxide be in a form which exposes a maximum of active surface to the gaseous reaction mixture. For this reason it has heretofore been proposed to prepare contact masses in which the vanadium oxide is in the form of a relatively thin coating upon particles of suitable material serving as a carrier or catalyst support.

One usual method of preparing vanadium oxide contact masses is to coat or impregnate particles of the carrier with a solution of ammonium metavanadate, evaporate the resulting mass to dryness, thereby producing a coating of the ammonium metavanadate on the carrier, and then heat or "ignite" the coated carrier in a stream of oxidizing gas to convert the ammonium metavanadate to the desired catalytically active vanadium oxides. Contact masses prepared in this manner have the disadvantages, among others, that their catalytic activity is not sufficiently great for many purposes; the number of suitable carriers which may be employed is limited because of the poor adherence of the vanadium oxide coating to the carrier; the ammonium metavanadate employed as starting material is only moderately soluble in water, which necessitates the use of excessively large volumes of water, the evaporation of which is time-consuming and which causes the salt to crystallize out on the carrier from solution soon after the start of the evaporation; the catalyst thus prepared requires a high reaction temperature for the catalytic process in order to give it the desired productivity; and the productive life of the catalyst is relatively short.

In order to increase the adherence of the catalyst to the carrier, other methods have been heretofore proposed for preparing the contact masses; but, in general, they require that the mixture to be applied to the carrier and subsequently ignited be prepared at the time and place where the catalyst is to be used.

An object of the present invention is to provide a new form of vanadium oxide having superior activity as a catalyst for vapor-phase oxidation reactions, particularly when associated with a relatively inert carrier in the form of small granules.

Another object of the invention is to provide vanadium compounds which may be prepared in advance of their use, stored and shipped without substantial deterioration, and which may be readily associated with a catalyst carrier and ignited to produce catalyzers or contact masses containing catalytic vanadium oxide, which contact masses have greater stability and activity than the vanadium oxide catalyzers resulting from the evaporation of a solution of ammonium metavanadate in admixture with a catalyst carrier followed by ignition of the resulting product.

Additional objects of the invention are to provide processes of making said vanadium compounds and catalyst.

Other objects of the invention will in part be obvious and will in part appear hereinafter.

I have found, in accordance with the present invention, when vanadium pentoxide or other suitable vanadium compound in solution or suspension is reacted with ammonia and sulfur dioxide, preferably in the form of an ammonium sulfite, and particularly in the form of a mixture of normal ammonium sulfite and ammonium acid sulfite, that a product is obtained which, upon subsequent ignition, results in a highly active vanadium oxide catalyst particularly suitable for the vapor phase catalytic oxidation of chemical compounds, and especially of aromatic hydrocarbons and derivatives. I have furthermore found, in accordance with the present invention, when the said product prior to ignition is associated with a suitable catalyst carrier, preferably in the form of an aqueous dispersion (solution and/or suspension), and then ignited, that a contact mass is obtained which is a highly active catalyst for the air oxidation of organic compounds in the vapor-phase.

The invention accordingly comprises the intermediates, catalysts and contact masses having the properties and characteristics exemplified in the products hereinafter disclosed, and the processes comprising the steps and the relation of each with others thereof which are exemplified in the processes hereinafter disclosed. The scope of the invention will be indicated in the claims.

In the practice of the present invention, in accordance with a preferred method of procedure, an oxygen-containing compound of vanadium, in which the vanadium is in the pentavalent state, may be heated in aqueous suspension or solution with a mixture of ammonia and sulfur dioxide, or an ammonium sulfite, until a partial reduction of the vanadium compound has been effected (for example, until a compound has been produced containing vanadium in the tetravalent state), and preferably until a water-soluble black compound of vanadium has been produced. The resulting product, preferably after being associated with a suitable catalyst carrier, may be heated in the presence of an oxidizing gas (ignited) to convert the reduced vanadium compound or black compound to the catalytically active oxide or mixture of oxides.

Any suitable oxygen compound of vanadium containing vanadium in the pentavalent state may be employed as starting material for the process, and preferably a vanadium pentoxide, as for example, vanadic acid, etc. A vanadium compound is preferably employed which is obtainable by digesting ammonium metavanadate with nitric acid until a red compound, probably a vanadium oxide or hydrated oxide, is obtained containing an amount of vanadium equivalent to at least 90 per cent of vanadium pentoxide.

The reducing agent preferably employed in the preparation of the catalyst of the present invention is an aqueous solution of ammonia and sulfur dioxide, preferably in amounts corresponding with a major proportion of normal ammonium sulfite, $(NH_4)_2SO_3$, and a minor proportion of ammonium acid sulfite, $NH_4HSO_3$, and especially in amounts lying within the range of about 1 to 2.2 parts by weight of sulfur dioxide per part by weight of ammonia.

The material employed as a carrier for the catalytically active vanadium oxide may be any of the usual materials; and it may be in the form of particles of any suitable size, ranging all the way from an extremely finely divided powder to lumps or granules, depending upon the process in which it is to be employed. Carriers which have rough surfaces and/or which are of a porous nature are preferred, inasmuch as their retentivity of the catalytically active coating is greater than that of carriers having smooth surfaces. Thus, aluminum having a rough surface (so-called "grained" aluminum), silica gel, aluminum oxide gel, kieselguhr, pumice, pumicite, zeolites, "Filtrose", asbestos, chamotte, and the like, may be employed as carriers. "Alundum", in the form of highly porous particles, obtained for example by bonding minute crystals of fused aluminum oxide with an aluminum silicate (as for example, that employed as a filtering medium and for gas diffusion apparatus), crushing the resulting mass and screening the crushed product, is particularly suitable for use as a carrier in connection with the present invention in view of its high porosity and resulting retentivity of the vanadium oxide, its relative infusibility, and its rigidity. It is advantageously employed in the form of granules 2 to 20 mesh in size, and preferably of a size capable of passing through a screen having openings of 0.125 inch, but incapable of passing through a screen having openings of 0.076 inch.

The carrier, when employed, may be associated with the reduced vanadium compound in any suitable manner and at any suitable stage of the process. Thus, it may be added to the initial reaction mixture, or it may be mixed with the reaction mixture at any stage during or after the reaction. It is advantageously mixed with the vanadium reduction product or water-soluble black compound of vanadium after the latter has been prepared and preferably separated from the reaction mixture, and while it is in the form of an aqueous suspension or solution; as by mixing, coating and/or impregnating the carrier, followed by evaporation to dryness, if necessary or desirable (as for example, by stirring and agitating the particles of carrier with an aqueous solution of the black compound of vanadium while heating the mixture until it is evaporated to dryness).

Various auxiliary substances, if desired, may be incorporated into the contact masses or associated with the vanadium oxide of the present invention; as for example, other catalysts and catalytic oxides (such as the oxides of the other metals of the fifth and of the metals of the sixth groups of the Periodic System, particularly molybdenum oxide); an activator, such as aluminum powder; or a stabilizer, such as a caustic alkali and/or a salt of an alkali or alkaline earth metal (as for example, potassium hydroxide, the normal and acid sulfates, phosphates, carbonates, etc. of sodium and potassium, etc. as disclosed in U. S. P. 1,371,004). These auxiliary substances also may be associated with the catalyst at any suitable stage of its preparation. They are preferably mixed in suitable form with the vanadium reduction product, for example the black compound of vanadium, in aqueous solution or suspension, if employed.

The vanadium reduction product (e. g., the water soluble black compound of vanadium) may be heated (ignited), by itself or associated with a carrier and/or with one or more of the auxiliary substances above referred to, in a current of oxidizing gas either prior to being charged into the catalytic apparatus in which it is to be used or while in place in the catalytic apparatus. It is preferably not heated to a temperature so high that fusion of resulting vanadium pentoxide is produced, as otherwise the activity of the catalyst will be impaired.

The contact masses of the present invention may be employed in a wide variety of processes of catalytic oxidation, and particularly in those processes of vapor phase oxidation of chemical compounds by means of air or other oxygen-containing gas where a highly active vanadium oxide catalyst is required; as for example, the oxidation of sulfur dioxide to sulfur trioxide, of ammonia to nitrogen oxides, of methane and methanol to formaldehyde, of ethyl alcohol to acetaldehyde, of chlorhydrin to chloracetic acid, of benzene, toluene and the like to maleic acid and quinones, of toluene to benzaldehyde and benzoic acid, of naphthalene and alkyl naphthalenes to phthalic acid, maleic acid and naphthoquinones, of anthracene to anthraquinone and phthalic acid, of fluorene to fluorenone, of acenaphthene to acenaphthylene and naphthalic acid, etc.

The invention will be illustrated by the following specific examples, in which the parts are by weight. The invention is not limited thereto, however, and variations may be made in the details of the process and product described, within the scope of the appended patent claims.

Example 1. Preparation of vanadium black salt

Part I.—To a solution of ammonium metavanadate (1 part) in about 24 parts of distilled water at a temperature of about 65° to 72° C. dilute nitric acid (9.5 per cent. $HNO_3$) is slowly added, with good stirring, until the solution is just acid toward Congo red test paper. The faintly acid solution is heated to boiling, and the solution is boiled until the vanadium salt is practically all precipitated (e. g., until a colorless or faintly colored filtrate is obtained by filtering off a test portion). During the whole boiling period the solution should be kept faintly acid toward Congo red test paper by the addition, if necessary, of nitric acid from time to time. When the precipitation is complete, the precipitate, which is red in color, is filtered off and washed with hot distilled water until the washings give no test for acidity toward Congo red paper. It may be dried at 70° to 110° C. and, if desired, stored in a dry place. A product is obtained containing an amount of vanadium equivalent to about 90 to 90.5 per cent. of vanadium pentoxide. This product will be hereinafter referred to as "vanadium red precipitate".

Part II.—Sulfur dioxide gas is passed into a well-stirred mixture of 456 parts of aqueous ammonia (sp. gr. 0.90) and 250 parts of water, maintained at a temperature of 20° to 30° C., until the ammonium sulfite which separates out redissolves and a pale yellow solution is obtained. The resulting solution is then weighed and analyzed for its ammonia ($NH_3$) and sulfur dioxide ($SO_2$) content. Sufficient aqueous ammonia (sp. gr. 0.90) is then added to the well-stirred solution at a temperature of 20° to 30° C. to bring the solution to a composition which contains a weight ratio of 1 part of ammonia ($NH_3$) to 2.1 parts of sulfur dioxide. If any ammonium sulfite separates out during this step, just enough distilled water is added to bring it into solution at room temperature. The final solution thus obtained is a clear, pale yellow in color; has a specific gravity of about 1.25; and contains about 11.0 per cent. of ammonia ($NH_3$) and 23.5 per cent. of sulfur dioxide ($SO_2$) by weight. Normal ammonium sulfite, $(NH_4)_2SO_3$, and a minor amount of ammonium acid sulfite, $NH_4HSO_3$, comprise the salts present in the solution.

Part III.—1000 parts of the vanadium red precipitate (prepared according to the process of Part I) is agitated with 6500 parts of water at 60° C., and to the agitated mixture there is added 1310 parts of the ammonium sulfite solution (prepared according to the process of Part II). The well-stirred mixture is heated to 85° to 90° C. until no vanadium red precipitate is any longer present (about 3 hours). The solution is then cooled to 25° C. to produce crystallization, and allowed to stand until no further crystallization takes place. This usually takes about 8 to 10 hours. The crystallized product is filtered off, washed three or four times with water, and then dried at 60° to 70° C. The resulting product, hereinafter referred to as "vanadium black salt", is a black compound of vanadium soluble in water, and may be crystallized from water without change in composition. According to analysis it contains 43.6 per cent. of vanadium, 6.09 per cent. of ammonium ($NH_4$), 4.53 per cent. of sulfate ($SO_4$), 11.3 per cent. of water ($H_2O$), and 34.5 per cent. of oxygen (by difference). The compound contains tetravalent and pentavalent vanadium about 52 per cent of the total vanadium being probably present in the tetravalent form, the remainder being probably present in the pentavalent condition. It may be stored in a dry place and shipped without substantial change in composition. It serves as an excellent intermediate for the preparation of highly active vanadium oxide catalysts, particularly when associated with a suitable catalyst carrier.

The amount of water employed to dissolve the ammonium metavanadate in the above example may vary, but it preferably should be sufficient completely to dissolve the ammonium metavanadate at 80° to 90° C. If the resulting solution is orange in color, it is preferably decolorized by the addition of just the necessary amount of concentrated ammonium hydroxide for the purpose, and if insoluble impurities are present, they are preferably removed by filtration before the solution is acidified with nitric acid. The amount and concentration of nitric acid employed may also vary, but preferably such an amount and dilution should not be used which will produce a brownish red flocculent precipitate. The concentration of the aqueous ammonia employed in the preparation of the ammonium sulfite solution is capable of considerable variation. For ease of operation the concentration should not be so great that the mixture is difficult to stir when the ammonium sulfite crystallizes out. Temperatures higher than 30° C. are preferably avoided in the preparation of the ammonium sulfite solution, as otherwise decomposition of the ammonium sulfite may result.

In making the vanadium black salt, an amount of ammonium sulfite solution is preferably employed containing at least 80 per cent. of the theoretical amount of sulfur dioxide required to reduce vanadium from the pentavalent to the tetravalent form. (Theoretically 1 mol. of sulfur dioxide is required to reduce 2 atoms of pentavalent vanadium to tetravalent vanadium.) A greater amount of ammonium sulfite solution may be employed if desired. The temperature of reaction between the aqueous suspension of vanadium red precipitate and the ammonium sulfite solution may be varied; it is preferably maintained between about 85° and about 100° C. The ratio of sulfur dioxide to ammonia in the ammonium sulfite solution is preferably about 1 to 2.2 parts by weight of sulfur dioxide per part by weight of ammonia. A greater proportion of sulfur dioxide gives a green compound of vanadium and a lesser proportion of sulfur dioxide produces a dark brown compound of vanadium; neither of which compounds is as valuable for the preparation of an active vanadium oxide catalyst as is the vanadium black salt.

Example 2. Preparation of vanadium oxide catalyst

Part I.—900 parts of vanadium black salt are dissolved in 3700 parts of water in a revolving kettle. (If desired, a suitable stabilizer, as for example about 20 parts of potassium sulfate or 12.9 parts of potassium hydroxide, and/or another suitable substance may be dissolved or suspended in the solution of the vanadium black salt.) 5040 parts of granules of a porous "Alundum" carrier of the type above referred to are then added. The "Alundum" is preferably of a size that passes through a screen having openings of 0.125 inch but remains on a screen having openings of 0.076 inch. It should be free from dirt and from any material which is of a clay-like nature or which is of a red or grey color; and it is preferably soaked for 6 to 8 hours in dilute nitric acid and then thoroughly washed with water until all the nitric acid is removed, before it is treated with the vanadium black salt solution. The mixture of carrier and vanadium black salt solution is evaporated to dryness with constant stirring in order to thoroughly impregnate and evenly distribute the vanadium black salt over the surface of the carrier. The resulting product comprises the "Alundum" carrier coated and/or impregnated with vanadium black salt (mixed with the modifier or other substance, if added).

Part II.—The carrier coated with the vanadium black salt is charged into a catalytic converter and ignited by heating it to a temperature somewhat below the fusion temperature of vanadium pentoxide while a stream of air, or air mixed with vapors of an organic compound, is passed in contact therewith. The resulting contact mass, comprising the carrier coated and/or impregnated with catalytically very active vanadium oxides (together with an auxiliary substance, if added), is a valuable catalyzer for the vapor phase air oxidation of organic compounds. Thus, when a mixture of naphthalene vapors and air, in the proportions of 1 to 30 by weight, is passed over or through a body of a contact mass of the present invention, maintained at a temperature of about 550° to 600° C. phthalic anhydride of very good quality can be obtained in higher yield than is produced by a vanadium oxide catalyst resulting from the decomposition of ammonium metavanadate.

In the preparation of a catalyst and/or contact mass, the reaction or other mixtures should preferably not be brought into contact with metallic substances; accordingly enamel, glass, wooden or equivalent non-metallic vessels and implements are preferably employed.

In preparing the contact mass in accordance with the procedure given in Example 2, aqueous ammonia may be added to the solution of vanadium black salt before evaporation of the mixture (i. e., of carrier and solution) to render it slightly alkaline, if desired.

While the catalyst of the present invention has been described in the above examples as associated with a carrier, the invention in its broad aspect does not require that a carrier be employed. A carrier is employed in the preferred practice of the invention, however, in view of its advantageous action in bringing about increased utilization of the active surface of the catalyst.

Since changes may be made in the process and the products above disclosed without departing from the scope of the invention, all matter contained in the above description is to be interpreted as illustrating and not limiting the invention, except as limited by the claims.

I claim:

1. A composition of matter suitable for the preparation of a vanadium oxide catalyst comprising a water-soluble compound of vanadium containing tetravalent and pentavalent vanadium and sulfur in the form of sulfate and obtainable by heating an oxygen compound of pentavalent vanadium with an aqueous solution of ammonia and sulfur dioxide.

2. A composition of matter suitable for the preparation of a vanadium oxide catalyst comprising a water-soluble compound of vanadium containing tetravalent and pentavalent vanadium and sulfur in the form of sulfate and obtainable by heating a vanadium pentoxide with a mixture of normal ammonium sulfite and ammonium acid sulfite.

3. A composition of matter suitable for the preparation of a vanadium oxide catalyst comprising a water-soluble compound of vanadium containing tetravalent and pentavalent vanadium and sulfur in the form of sulfate and obtainable by adding dilute nitric acid to an aqueous solution of ammonium metavanadate, boiling the resulting mixture while maintaining it acid to Congo red test paper, whereby a red precipitate is obtained, reacting the red precipitate with an aqueous solution of ammonia and sulfur dioxide in the proportions of 1 to 2.2 parts of sulfur dioxide per part by weight of ammonia, whereby a water-soluble vanadium compound is produced, and crystallizing the said water-soluble vanadium compound from the solution.

4. A composition of matter suitable for the preparation of a vanadium oxide catalyst comprising a black, water-soluble, crystalline, complex vanadium compound containing in combination tetravalent and pentavalent vanadium, nitrogen in the form of ammonia, and sulfur in the form of sulfate.

5. A composition of matter suitable for the preparation of a vanadium oxide catalyzer comprising a catalyst carrier associated with a water-soluble compound of vanadium containing tetravalent and pentavalent vanadium and sulfur in the form of sulfate and obtainable by subjecting an oxygen compound of pentavalent vanadium to the reducing action of sulfur dioxide in the presence of an aqueous solution of ammonia.

6. A composition of matter suitable for the preparation of a vanadium oxide catalyzer comprising a catalyst carrier associated with a water-soluble black compound of vanadium containing tetravalent and pentavalent vanadium and sulfur in the form of sulfate and obtainable by heating a vanadium pentoxide with an aqueous mixture of normal ammonium sulfite and ammonium acid sulfite.

7. A composition of matter suitable for the preparation of a vanadium oxide catalyzer comprising a porous catalyst carrier, in the form of small granules, impregnated and coated with a black, water-soluble, crystalline, complex vanadium compound containing in combination tetravalent and pentavalent vanadium, nitrogen in the form of ammonia, and sulfur in the form of sulfate.

8. A vanadium oxide catalyst obtainable by subjecting an oxygen compound of pentavalent vanadium to the reducing action of sulfur dioxide in the presence of an aqueous solution of ammonia, whereby a water-soluble compound of vanadium containing tetravalent and pentavalent vanadium and sulfur in the form of sulfate is produced and igniting said water-soluble vanadium compound.

9. A vanadium oxide catalyst obtainable by heating a vanadium pentoxide and an aqueous mixture of a major proportion of normal ammonium sulfite and a minor proportion of ammonium acid sulfite, whereby a water-soluble compound of vanadium is produced, and igniting said water-soluble compound of vanadium.

10. A contact mass for the vapor phase oxidation of chemical compounds comprising catalytically active vanadium oxide associated with a catalyst carrier and obtainable by adding dilute nitric acid to an aqueous solution of ammonium metavanadate at a temperature of 62° to 75° C., boiling the resulting mixture while maintaining it faintly acid to Congo red test paper until a substantially colorless filtrate is obtained upon filtering the mixture, whereby a red precipitate containing an oxygen compound of pentavalent vanadium is obtained, reacting the red precipitate in aqueous suspension with an aqueous solution of ammonia and sulfur dioxide in the proportion of about 2 parts of sulfur dioxide per part by weight of ammonia at a temperature of 85° to 100° C., the amount of sulfur dioxide being at least 80 per cent. of that theoretically required to reduce the vanadium present in the red precipitate from the pentavalent to the tetravalent state, whereby a water-soluble black vanadium compound is produced, associating said water-soluble black vanadium compound with a catalyst carrier, and igniting the resulting product.

11. A contact mass for the vapor phase oxidation of chemical compounds comprising catalytically active vanadium oxide associated with a catalyst carrier and obtainable by impregnating and coating a porous catalyst carrier, in the form of small granules, with a black, water-soluble, crystalline, complex vanadium compound containing in combination tetravalent and pentavalent vanadium, nitrogen in the form of ammonia, and sulfur in the form of sulfate and heating the resulting mass in an oxidizing atmosphere.

12. A method of making a vanadium oxide catalyst which comprises heating vanadium pentoxide with an aqueous mixture of normal ammonium sulfite and ammonium acid sulfite, whereby a water-soluble compound of vanadium is produced, and igniting the resulting water-soluble compound.

13. A method of making a vanadium oxide catalyst which comprises heating an oxygen compound of pentavalent vanadium with an ammonium sulfite, whereby reduction of the vanadium is effected and a water-soluble compound of vanadium containing tetravalent and pentavalent vanadium and sulfur in the form of sulfate is produced, and igniting the resulting reduced vanadium compound.

14. A method of making a vanadium oxide catalyst which comprises heating a vanadium pentoxide with an aqueous mixture of normal ammonium sulfite and ammonium acid sulfite in which mixture the normal ammonium sulfite predominates, whereby a water-soluble compound of vanadium is produced, and igniting the resulting compound by heating it in an oxidizing atmosphere.

15. A method of making a vanadium compound suitable for use in the preparation of a vanadium oxide catalyst which comprises adding dilute nitric acid to an aqueous solution of ammonium metavanadate, boiling the resulting mixture while maintaining it acid to Congo red test paper, whereby a red precipitate is obtained, and reacting the red precipitate with an aqueous solution of ammonia and sulfur dioxide in the proportions of 1 to 2.2 parts of sulfur dioxide per part by weight of ammonia at a temperature not less than 85° C. whereby a water-soluble compound of vanadium is produced, and crystallizing the water-soluble vanadium compound from the solution.

16. A method of making a vanadium oxide catalyzer which comprises adding dilute nitric acid to an aqueous solution of ammonium metavanadate at a temperature of 62° to 75° C., boiling the resulting mixture while maintaining it faintly acid to Congo red test paper until a substantially colorless filtrate is obtained upon filtering the mixture, whereby a red precipitate containing an oxygen compound of pentavalent vanadium is obtained, reacting the red precipitate in aqueous suspension with an aqueous solution of ammonia and sulfur dioxide in the proportion of about 2 parts of sulfur dioxide per part by weight of ammonia at a temperature of 85° to 100° C., the amount of sulfur dioxide being at least 80 per cent. of that theoretically required to reduce the vanadium present in the red precipitate from the pentavalent to the tetravalent state, whereby a water-soluble black vanadium compound is produced, associating said water-soluble black vanadium compound with a catalyst carrier, and igniting the resulting product.

17. A method of making a contact mass for the vapor phase oxidation of organic chemical compounds which comprises impregnating and coating a porous catalyst carrier, in the form of small granules, with a black, water-soluble, crystalline, complex vanadium compound containing in combination tetravalent and pentavalent vanadium, nitrogen in the form of ammonia, and sulfur in the form of sulfate, and heating the resulting mass in an oxidizing atmosphere.

18. A method of making a vanadium oxide catalyzer which comprises adding dilute nitric acid to an aqueous solution of ammonium metavanadate at a temperature of 65° to 72° C., boiling the resulting mixture while maintaining it faintly acid to Congo red test paper until a substantially colorless filtrate is obtained upon filtering the mixture, whereby a red precipitate is obtained, agitating 1000 parts of said red precipitate with 6500 parts of water at 60° C., adding to the mixture 1310 parts of an aqueous solution of ammonium sulfites, having a specific gravity of about 1.25 and containing about 11.0 per cent. of ammonia and about 23.5 per cent. of sulfur dioxide by weight, heating the resulting mixture at 85° to 90° C. until the red precipitate is no longer present, letting the resulting solution stand at about 25° C. until crystallization of a black vanadium salt has taken place, separating the black vanadium salt from the remaining solution, dissolving the black vanadium salt in water, mixing with the solution granules of a porous alundum carrier of a size that pass through a screen having openings of 0.125 inch, evaporating the mixture, and igniting the resulting product.

HAROLD B. FOSTER.